Aug. 14, 1956 R. KOLLGAARD 2,758,883
TRANSFER AND CIRCULATION OF SOLID GRANULAR MATERIAL
Filed June 28, 1950 2 Sheets-Sheet 1
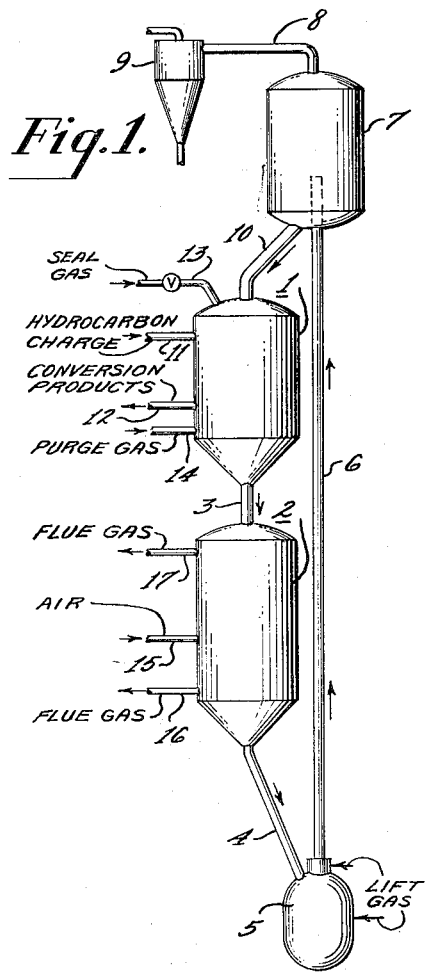
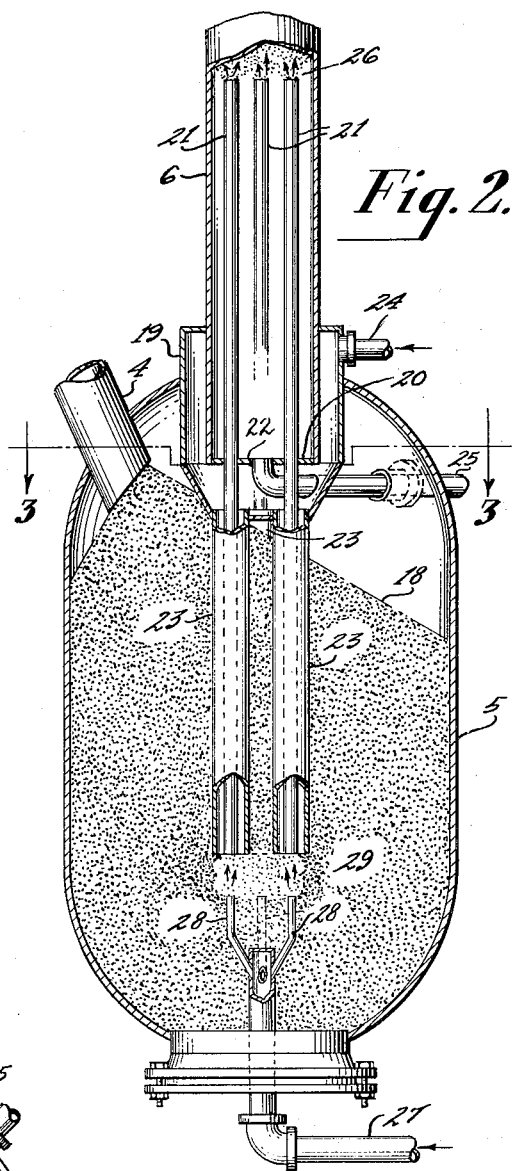
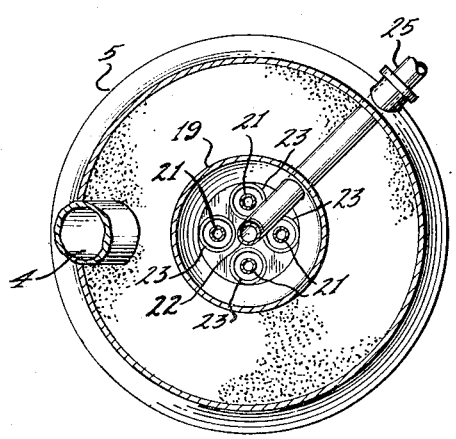
INVENTOR
Reyner Kollgaard
BY
ATTORNEY Aug. 14, 1956     R. KOLLGAARD     2,758,883
TRANSFER AND CIRCULATION OF SOLID GRANULAR MATERIAL
Filed June 28, 1950     2 Sheets-Sheet 2
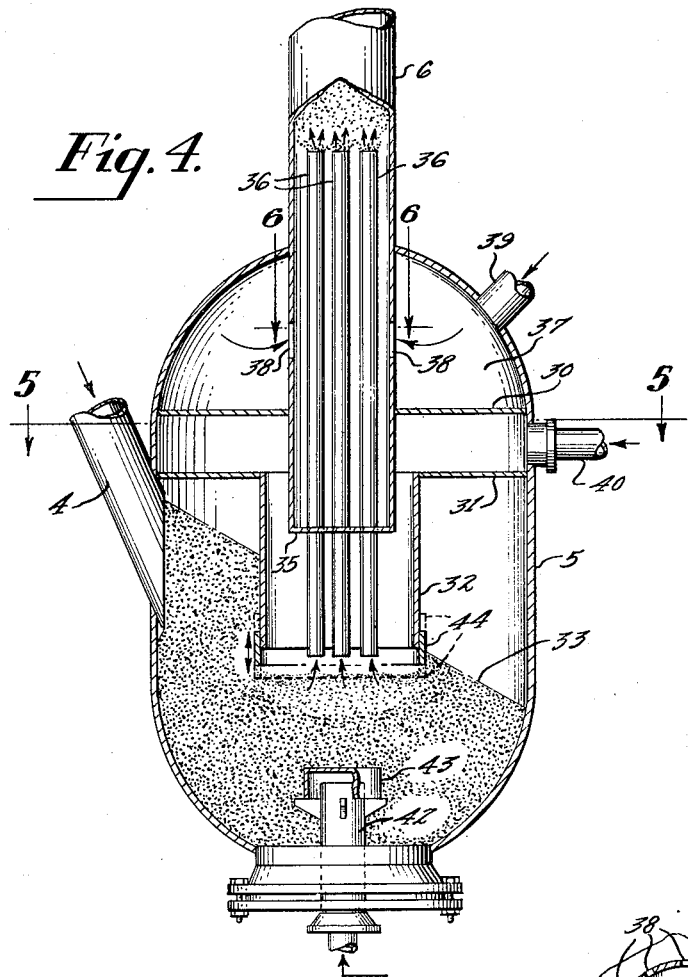
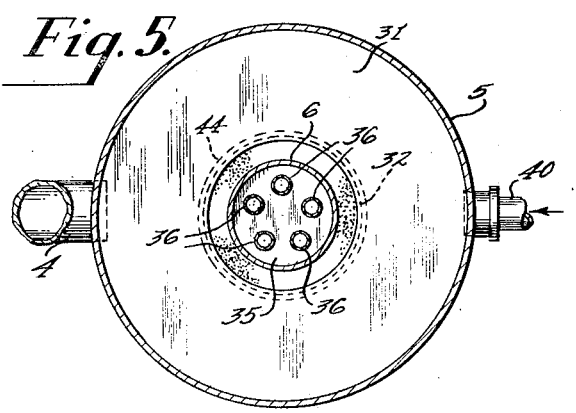
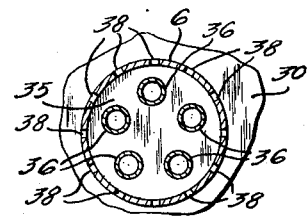
INVENTOR
Reyner Kollgaard
ATTORNEY United States Patent Office 2,758,883
Patented Aug. 14, 1956

2,758,883

TRANSFER AND CIRCULATION OF SOLID GRANULAR MATERIAL

Reyner Kollgaard, Media, Pa., assignor to Houdry Process Corporation, Wilmington, Del., a corporation of Delaware Application June 28, 1950, Serial No. 170,931

3 Claims. (Cl. 302—57)

The present invention relates to improved means for the transfer and circulation of solid granular material of discrete particle size. The invention finds its most important application in connection with systems wherein catalyst or other contact mass in granular form and of comparatively large particle size, subject to attrition by impact and friction, is continuously circulated to and from a reaction zone and is elevated from a lower to a higher level through a substantial height during the course of such circulation. Familiar examples of such systems are those employed in hydrocarbon conversion processes.

Typical hydrocarbon conversion processes utilizing solid granular catalyst include: cracking, dehydrogenation, aromatization, reforming and the like. In these and other hydrocarbon conversion processes the catalyst, as a result of reactions taking place during contact with the hydrocarbon charge, usually accumulates thereon a carbonaceous or hydrocarbonaceous deposit called coke, formed as a by-product of such reactions, resulting in lowering the activity of the catalyst. Accordingly, it is the usual practice periodically to subject the used catalyst to regeneration by combustion of the deposited coke, in air or other oxygen-containing gas.

In moving catalyst systems, the catalyst is continuously passed through the hydrocarbon conversion zone and the resulting coke-containing catalyst discharged therefrom is transferred to a separate vessel or zone for regeneration. Since in the usual moving catalyst systems of this type, the catalyst during its course of circulation passes downwardly from a higher to a lower level, it is necessary to return the catalyst to the upper level for repetition of the cycle of operations. While earlier commercial installations employ mechanical means, such as bucket elevators, for transporting the catalyst to the required elevation, in more recent designs elevation of the catalyst is effected in a pneumatic lift.

It has been demonstrated that granular solids may be smoothly introduced into lift pipes of comparatively small diameter and may be efficiently transported through such small diameter pipes with desired low attrition losses, when the granular solid is introduced into the lift pipe in proper manner, and appropriate lift conditions are maintained which obtain suitable concentration of the moving particles in the lift and linear velocities at which such particles move upwardly in substantially straight line flow. As the diameter of the lift pipe is extended to greater and greater size for the purpose of handling the required large quantities of granular solid, the attainment of straight line flow at the inlet to the lift and within the lower portion thereof becomes exceedingly difficult, because of augmented tendency to lateral flow of the particles with increasing momentum and conditions favoring turbulence, with the resulting introduction of factors tending to cause attrition.

In a copending application of William W. Weinrich, filed of even date herewith, certain improved methods and means for transfer and circulation of solid granular material are disclosed wherein the granular material, such as catalyst, is introduced into a wide lift conduit without substantial turbulence and free from attrition that may be occasioned thereby, by initially feeding the granular material through one or more narrower feeder passages discharging into the lift conduit, and engaging the discharging granular material therein with a lifting fluid to transport the material through the desired vertical distance.

By the present invention, in common with the aforesaid copending application, granular catalyst or other granular material of discrete particle size and of the type described is introduced upwardly into a lift conduit by means of one or more feeder passages of narrower dimension than the lift conduit into which the same discharge, and the discharged granular material is engaged in that lift conduit by a stream of separately introduced lift gas. In accordance with the present invention, however, the gas directly introduced into the wider path of the principal lift conduit is supplied at a particular controlled rate such that this gas flows into engagement with the solids discharged into that conduit by the feeder, at a linear velocity substantially equal to the linear velocity of the gas entering the lift conduit with the solids from the narrower feeder, so that there is no substantial change in gas velocity in passing from the narrower feeder into the wider lift conduit. Because of the constancy of the gas velocity thus maintained, the granular solids discharged from the feeder are caused to continue their upward movement upon admission into the principal lift conduit without substantial change in the velocity of the solid particles. Moreover, to assure smooth flow of the solid particles into and through the principal lift conduit, the granular solid is discharged from the feeders only after it has attained a certain minimum velocity at which it has been found there is no tendency for slugging or other departure from continuous straight line flow of the particles. The granular material is, therefore, initially fully accelerated in the narrow feeders and discharged therefrom into the principal lift conduit at a controlled velocity determined by the linear velocity desired to be maintained in the principal lift conduit. Any acceleration of the particles occurring thereafter during their upward travel through the remainder of the lift path would be only that incidental to gas expansion inherently resulting from decreased static pressure.

By operating in the described manner, the transfer of granular material from the narrow feeder to the widened path in the principal lift conduit is accomplished most smoothly, without significant velocity change, and with minimum risk of disturbance of the regularity of flow. Factors contributing to attrition of the granular material as a result possibly of turbulence, slugging, and other conditions causing collision between particles, are considerably reduced. The granular particles having been started up and accelerated to a required linear velocity in the narrow feeder path, are contacted with the added gas under appropriately selected conditions to continue their upward travel in the expanded path maintaining their substantially streamline flow. Since the major part of the total lift gas, which is that supplied to the principal lift conduit, is not required to expend energy directly in acceleration of the granular material, that gas may be supplied at much lower pressure than would otherwise be necessary, thus providing an absolute optimum in the economy of operation. Acceleration that may take place in the principal lift conduit as a result of pressure drop will be quite gradual as compared with the rate of acceleration obtaining in the feeder. All of the granular material thus is caused to travel through the major portion of the total upwardly directed path under conditions approaching as far as possible substantially uniform velocity.

The invention has its principal application in the elevation of solid contact masses, such as catalyst, in the form of granular particles of comparatively large particle size, which are subject to attrition by friction and impact. The invention is more particularly concerned with granular particles having an average and predominant size in the order of about 14 mesh and above, including typical commercial bead hydrocarbon conversion catalysts and molded pellets of clay or synthetic catalysts of from about 2–5 mm. size. The improved operation of the invention is especially advantageous in the handling of granular materials that are fairly dense, such as those having an apparent bulk density of at least 20 pounds per cubic foot under random pack conditions. Particles of the indicated size and density are distinguished by the property of flowing freely in bulk non-fluidized state, as when discharged from a bin or hopper, in contrast to light or more finely divided or powdered materials which, particularly when of diverse size range, tend to agglomerate and pack and can be flowed freely only when converted to so called "fluidized" state and handled similarly to flowing liquids.

It has been found that smooth and regular continuous flow of granular material, such as catalyst, of the size and density particularly set forth above, in lift conduits of substantial height is obtained under conditions such that the average linear velocity of the particles during the major portion of their travel through the conduit is not less than about 10 feet per second. For this reason it is advantageous to accelerate the granular material in the feeder path to a velocity of at least 10 feet per second, and preferably to about 15–30 feet per second, prior to discharge into the principal lift conduit. Although acceleration to velocities higher than 30 feet per second in the feeders is readily obtained, if desired, such higher velocities are not recommended in view of the accompanying complications of disengaging the granular material from the transporting gas at the top of the main lift conduit at attained high discharge velocities, without accompanying high attrition in that zone.

The invention will be understood and other advantages thereof appreciated from the detailed description which follows read in connection with the accompanying drawings illustrating certain forms of apparatus for the practice thereof as applied to hydrocarbon conversion systems. In these drawings:

Figure 1 is a schematic view in elevation showing the general arrangement of processing vessels and transporting lift;

Figure 2 is a largely diagrammatic longitudinal cross section of the lift hopper and the bottom portion of the lift conduit, portions being broken away to show internal structure;

Figure 3 is a transverse section taken on the line 3—3 of Figure 2;

Figure 4 is a view similar to that shown in Figure 2, illustrating a modified embodiment;

Figures 5 and 6 are transverse sections taken respectively on the lines 5—5 and 6—6 of Figure 3.

In the system illustrated in Figure 1, a hydrocarbon conversion reactor 1 is superimposed over a kiln 2, and is in solids flow communication therewith by means of a conduit 3. Catalyst discharged from the bottom of kiln 2 passes by means of a conduit 4 into the lift hopper 5, wherein it is engaged by a lift gas and is impelled upwardly into the lift conduit 6 and transported therethrough by lift gases into a disengaging vessel 7. In the disengaging vessel, as a result of the expanded cross section, the catalyst settles out from the gas stream and the gas is withdrawn overhead by means of a discharge line 8. Means may be provided in line 8 for separation of any fines from the gas stream, such as the cyclone separator indicated at 9. The catalyst separated from the gas in the disengaging vessel 7 gravitates to the bottom of that vessel and is discharged therefrom by means of a conduit 10 feeding into the top of reactor 1.

The catalyst gravitates in the reactor 1 as a compact bed and hydrocarbons are passed through the bed for the required catalytic conversion. Thus, as schematically illustrated in Figure 1, the hydrocarbons can be introduced through a line 11 to flow concurrently with the catalyst, conversion products being discharged from the reactor through a line 12. A supply line 13 is provided at the top of the reactor for the admission of steam or other inert gas as may be required for maintaining the desired pressure at the top of the reactor, to serve as seal gas in the conduit 10, and provides supplementary process steam in the reactor. Prior to discharge from the reactor 1 the catalyst passes through a purge zone near the bottom thereof, wherein it is contacted with steam or other inert gas, admitted as illustrated through line 14.

The coke-containing catalyst discharged from the reactor 1 passes by means of conduit 3 into the kiln 2 through which it gravitates as a compact bed and is contacted therein with oxygen-containing gas, such as air, to effect combustion of the coke. Various types of kilns of the compact moving bed type are known to the art and may be employed in the described system. In accordance with the embodiment diagrammatically illustrated in Figure 1, the regenerating gas is introduced at an intermediate region of the kiln as by means of a line 15, so that the flow of the gas through the kiln is divided, a portion flowing downwardly concurrently with the catalyst with the formation of gaseous combustion products discharged through line 16; the remainder of the gas flowing upwardly through the kiln and the formed combustion products being discharged near the top of the kiln through line 17. In the ordinary operation of this type of system, a portion of the purge gas introduced through line 14 will be permitted to flow downwardly through conduit 3 and be discharged at the top of the kiln with the flue gas removed through line 17. In some instances it may be preferred to admit separate seal gas to the top of the kiln for upward flow through the conduit 3.

The regenerated catalyst entering hopper 5 through conduit 4 is contacted with lift gas in appropriate manner, hereinafter more fully described, thereby effecting desired elevation of the catalyst for repetition of the described cycle.

In the embodiment illustrated in Figures 2 and 3 the catalyst entering the engager hopper 5 forms a bed therein assuming a normal angle of repose as indicated by the upper surface of the catalyst bed 18. The bottom portion of the lift conduit 6 passes through the top of lift hopper 5 and that portion is surrounded by a sleeve 19 which is closed at the top thereof. The bottom of conduit 6 is closed by a plate member 20 provided with gas sealed openings therein for the passage into the conduit of a plurality of feeder pipes 21 and a central gas inlet line 22. All of the feeder pipes 21 terminate at a common level within conduit 6 and extend downwardly through the bottom of the conduit for a substantial distance in the hopper 5 below the catalyst level 18 but short of the bottom of the hopper. Each of the feeder pipes 21 is surrounded by a concentric tubular sleeve 23 extending through the closed bottom of sleeve 19 and terminating approximately on a level with the bottom of each of the feeder pipes 21. The sleeve 19 is provided with a gas supply inlet 24, and the central gas inlet line 22 connects with a supply line 25 passing through the sleeve 19 and through the outer wall of hopper 5.

In the operation of this embodiment gas supplied to the sleeve 19 by the inlet 24 will pass downwardly through the sleeve 19 into the tubular sleeves 23 and thence downwardly therethrough, to be discharged as an annular stream at the bottom of sleeve 23. The gas passes for a short distance into the catalyst bed below the sleeves 23 and then reverses direction and passes upwardly into each of the feeder pipes 21, picking up a portion of the catalyst from the bed within the hopper 5 and lifting the same into and through the feeder pipe. By means of this gas the catalyst is transported through the feeder pipe and is discharged therefrom into the lift conduit 6 as indicated at 26. The additional gas admitted through line 25 passes directly into the lift conduit 6 through the bottom thereof and then upwardly through that conduit in the free space surrounding the feeder pipes 21, ultimately engaging the catalyst discharged into the conduit 6 through the feeder pipes 21.

In the arrangement illustrated in Figure 2 gas is also introduced through the catalyst bed in hopper 5 by means of a gas supply line 27 having a number of communicating nozzles 28 arranged respectively in line with each of the feeder pipes 21 and terminating below such feeder pipes at a sufficient distance to provide a gap 29 for flow of catalyst between the tops of the nozzles and the bottom of the feeder pipe. Gas thus admitted through the nozzles 28 assists in moving the catalyst from the bed into the feeder pipes. In some instances the line 27 instead of terminating in a plurality of individual jets may be designed to diffuse gas generally into the catalyst bed lying below the bottom of the feeder pipes 21.

In the modified embodiment illustrated in Figures 4, 5 and 6, the lift hopper 5 is provided with a partitioning plate 30 extending across the hopper and forming a gas tight seal between the portions of the hopper lying above and below the partition. Below the partition there is provided a plate member 31 having a central depending housing 32 extending therebelow, surrounding the bottom portion of lift conduit 6 which passes through partition member 30. In this embodiment the conduit 4 supplying catalyst to the hopper 5 communicates with the hopper at a level below the plate 31 and the catalyst assumes a general angle of repose within the hopper as indicated at 33.

The conduit member 6 is closed at the bottom thereof by means of a plate member 35 provided with gas tight opening therein through which feeder pipes 36 pass. These feeder pipes extend upwardly into the lift conduit 6 and downwardly for a substantial distance below the plate member 35, terminating within the hopper at or near the level of the bottom of housing member 32.

In the described embodiment, as shown, there is formed in the hopper 5 a gas chamber 37 above the partition 30 and a catalyst-receiving chamber below the plate 31. That portion of conduit 6 lying within the chamber 37 is provided with gas inlet openings in the form of slots or perforations 38 peripherally spaced therein. The gas chamber 37 communicates with an external gas supply source through a duct 39. Gas is also admitted into the space provided between partition member 30 and plate 31, through a duct 40.

In the operation of this modified embodiment gas admitted through duct 40 will pass downwardly in the housing 32 and for a short distance into the catalyst bed lying below and within the area of that housing. The gas will then reverse direction and pass upwardly into the feeder pipes 36 picking up catalyst from the bed and lifting the same into and through the feeder pipes, discharging the same at the top of the feeder pipes into the lift conduit 6. Additional gas supplied through line 39 enters the gas chamber 37 and then passes through the openings 38 directly into the lift conduit 6 at a level below the discharge outlets of feeder pipes 36. Gas thus admitted will pass upwardly in the conduit 6 around the feeder pipes 36 and ultimately engage the catalyst being discharged from the feeder pipes, to transport the same to the top of lift conduit 6.

To assist in the lifting of catalyst into the feeder pipes, it has been found often advantageous to diffuse a small amount of gas upwardly through the bed. This may be accomplished, as shown in Figure 4, by providing diffuser nozzle 42 passing gas into the catalyst bed in hopper 5. A cap or hood 43 prevents catalyst from falling into the nozzle.

Instead of a single gas diffuser pipe 42, as shown, each of the feeder pipes 36 may be provided with a separate gas nozzle in line therewith as illustrated, for instance, in Figure 2.

To further extend the flexibility of operation, the housing 32 may be provided at the bottom thereof with an adjustable collar 44, capable of being raised and lowered thereon, so that the bottom periphery thereof may be adjusted over a range from a position just above the inlet ends of feeder pipes 36, to a position a small distance below the ends of feeder pipes. Such adjustment of the collar at the bottom of the housing member 32 determines the level of the catalyst lying below the housing and provides a further control of catalyst pick up by the gas passing into the feeder pipes 36.

Although in the drawings a plurality of feeder pipes are shown supplying a single lift conduit, it will be understood that the invention may be practiced with a single feeder of adequate size feeding into a lift conduit of larger diameter than the feeder. The number of feeder pipes required will depend upon the size of the lift conduit and the relative size of the feeder pipes. Preferably the feeder pipes are arranged in a symmetrical pattern adjacent the inner periphery of the lift conduit but spaced therefrom a sufficient distance to permit the added transporting gas admitted to the lift conduit to completely surround each feeder pipe, and thus peripherally engage the stream of catalyst discharged from each of the respective feeders.

Common to the several described embodiments of the invention, a stream of upwardly moving gas engages one or more streams of catalyst moving upwardly at a certain minimum velocity in substantially straight line flow, within a laterally enclosed path of larger transverse section than that of the stream or streams discharged into that path. Smooth continued flow of the catalyst is assured with little possibility for the introduction of factors that may contribute to attrition, by careful control of the amount of gas added in the widened path provided in the principal lift conduit, such that there is no abrupt change in gas velocity (nor in catalyst velocity) in passing from the smaller feeder passage into the larger lift conduit. The gas velocity reached at the discharge outlets of the feeder pipes is maintained substantially unchanged by supplying gas to the principal lift conduit at the required rate to compensate the difference in solids-free area of the feeder pipe and the principal lift conduit. Stated otherwise, the mass flow rate of the gas discharged from any feeder in pounds per square foot of free cross-section per second at the top of the feeder is brought to the same value [lbs. /ft.² (sec.)] by addition of the same kind of gas in the expanded path of the principal lift conduit. Of course, it is not necessary that the same kind of gas be added to the lift as is employed in the feeders; if desired any compatible gas in appropriate amount may be substituted.

As previously pointed out, the catalyst or other granular solid is discharged from the feeders at a linear velocity of at least 10 feet per second and preferably at about 15 to 30 feet per second. By accelerating the granular solids to the stated minimum velocity, essentially smooth straight line flow is assured free from significant tendency to slugging. In a lift of uniform cross-section wherein the total gas and solids are discharged at the top thereof into a disengager, the gas flowing in the lift conduit will accelerate as a result of progressive pressure drop and the linear velocity of the solids will be increased accordingly. The higher the maximum velocity attained by the solids, other conditions being equal, the greater will be the height of projection of the solids beyond the top of the lift conduit into the disengager, with greater possibilities for attrition. For that reason, it is generally preferred not to accelerate the catalyst in the feeders to a velocity higher than about 30 feet per second. This degree of acceleration can be obtained in feeders of adequate size by the use of a relatively minor quantity of gas for initially lifting the solids into the feeders and transporting the same therethrough to the principal lift conduit. Since the major portion of the transporting gas which is introduced separately in the lift proper, contacts solids already in positive upward motion at desired velocity and the added gas is not required directly to accelerate the solids at the point of engagement therewith, such added transporting gas may be introduced at relatively low pressure, wherefore gases or vapors obtained from the unit (such as flue gas or hydrocarbon conversion products) may be employed at existing pressures without the necessity for expensive compression.

The following example illustrates a typical operation carried out in a commercial size unit designed to circulate catalyst at the rate of 200 tons per hour through a 19 inch lift conduit of uniform cross section and of about 150 to 200 feet in height. This involves a mass circulation rate of catalyst at 56.4 pounds per square foot per second. The catalyst has an average diameter of about 0.12 inch, a pellet density of 80 pounds per cubic foot, and a random packed bulk density of about 50 pounds per cubic foot. For lifting this catalyst from zero velocity to the top of the lift at an attained maximum velocity of thirty feet per second using flue gas (M. W.=30) at 1050° F., a total gas supply of about 15,900 pounds per hour, is required.

The lift is fed by a number of feeder pipes of narrow cross-section and accelerated therein to a discharge velocity of 20 feet per second. Using six 4 inch feeder pipes for this purpose, the amount of gas required to lift the catalyst into and through the feeders at the stated discharge velocity will be about 3900 pounds per hour, the balance of the total gas requirement, amounting to 12,000 pounds per hour, being supplied directly to the lift conduit. Instead of six 4 inch pipes, a smaller number of larger pipes or a larger number of smaller pipes providing the same total internal cross sectional area may be employed. These pipes may be of any desired height, preferably about 5 to 20 feet, to provide an adequate length of the path in which the desired acceleration is effected.

Obviously many modifications and variations of the invention as hereinbefore set forth may be made without departing from the spirit and scope thereof and therefore only such limitations should be imposed as are indicated in the appended claims.

I claim as my invention:

1. Apparatus for elevating granular solid material by fluids, comprising a pressure sealed hopper adapted to contain a bed of solid material, an upright lift conduit of wide diameter in communication with and extending above said hopper to a zone of discharge, a plurality of open-ended feeder pipes of narrow cross-section having their outlet ends within the lift conduit and their inlet ends extending below said conduit into said hopper, said pipes being spaced from each other to form a symmetrical pattern, a housing within said hopper surrounding the outer periphery of said pattern of feeder pipes and horizontally spaced therefrom, said housing having its lower end terminating at a level approximate the inlet ends of the feeder pipes, means for introducing solids into said hopper arranged at a sufficient distance above the inlet of the feeder pipes to provide a bed level of the solids in the hopper above said inlets and surrounding said housing, means for continuously introducing fluid into said housing for downward flow therethrough into the bed of solids therebelow, said conduit being sealed against direct flow of fluid thereinto from said housing externally of said feeder pipes, whereby the fluid thus admitted into the bed of solids is caused to flow upwardly into and through said feeder pipes together with solids picked up from the bed thereby, said fluid and solids being discharged into the conduit at the outlets of the feeder pipes, said conduit being further provided with an opening therein below the level of the feeder pipe outlets for direct admission of additional fluid into said conduit externally of said feeder pipes, and means for supplying said additional fluid to said conduit.

2. Apparatus in accordance with claim 1 wherein said housing comprises an adjustable collar at the lower end thereof, said collar being longitudinally movable on said housing selectively to fix the vertical distance between the inlets to said feeders and the bottom of the housing.

3. Apparatus for elevating granular solid material by fluids, comprising a pressure sealed hopper adapted to contain a bed of solid material, an upright lift conduit of wide diameter extending upwardly from the top of said hopper to a zone of discharge, said conduit having a closure member sealing the bottom thereof, an open-ended feeder pipe of narrower cross section than said conduit extending upwardly through said closure member into said conduit and downwardly into said hopper, a gas supply housing having an upper portion surrounding the lower portion of said conduit and a lower portion surrounding said feeder pipe, means for continuously supplying solid material to said hopper arranged at a location to provide a bed level of solids surrounding the said lower portion of said housing, means for introducing fluid into said housing, and separate means for introducing fluid into said conduit externally of said feeder pipe.

References Cited in the file of this patent

UNITED STATES PATENTS

| | | |
|---|---|---|
| 528,417 | Duckham | Oct. 30, 1894 |
| 1,498,630 | Jensen | June 24, 1924 |
| 1,549,285 | Baker | Aug. 11, 1925 |
| 2,493,911 | Brandt | Jan. 10, 1950 |

FOREIGN PATENTS

| | | |
|---|---|---|
| 180,397 | Great Britain | May 11, 1922 |
| 268,667 | Great Britain | Apr. 7, 1927 |
| 7,075 | Netherlands | June 15, 1922 |